United States Patent [19]

Ganter

[11] Patent Number: 4,714,352

[45] Date of Patent: Dec. 22, 1987

[54] ELECTRONIC DEVICE POWERED BY SOLAR CELLS

[75] Inventor: Wolfgang Ganter, Schramberg, Fed. Rep. of Germany

[73] Assignee: Junghans Uhren GmbH, Schramberg, Fed. Rep. of Germany

[21] Appl. No.: 882,462

[22] Filed: Jul. 7, 1986

[30] Foreign Application Priority Data

Jul. 6, 1985 [DE] Fed. Rep. of Germany ....... 3524290

[51] Int. Cl.⁴ .......................... G04B 1/00; G04B 9/00; H02J 7/00

[52] U.S. Cl. ........................................ 368/64; 368/66; 368/204; 368/205; 320/1

[58] Field of Search .......................... 368/66, 203–205; 320/1, 2; 363/42; 136/293

[56] References Cited

U.S. PATENT DOCUMENTS

| | | | |
|---|---|---|---|
| 3,955,353 | 5/1976 | Astle | 368/157 |
| 4,112,670 | 9/1978 | Morolumi | 368/87 |
| 4,291,266 | 9/1981 | Portmann | 368/205 |
| 4,634,953 | 1/1987 | Shoji et al. | 320/1 |

FOREIGN PATENT DOCUMENTS

| | | | |
|---|---|---|---|
| 57-201882 | 10/1982 | Japan | 368/205 |
| 60-3578 | 1/1985 | Japan | 368/205 |
| 2158274 | 11/1985 | United Kingdom | 368/205 |

OTHER PUBLICATIONS

Yamada, "'No Battery' Analog Quartz Watch," Proceedings No. 2 of the XI International Conference for Chronometry, (Besancon, Oct. 1984).

*Primary Examiner*—Vit W. Miska
*Attorney, Agent, or Firm*—Burns, Doane, Swecker & Mathis

[57] ABSTRACT

A small electric device powered by solar cells and by a capacitive charge storage element has stable actuation assured during startup with an as yet uncharged capacitor. Startup problems are avoided by control of the power supply with a threshold value circuit that allows power to be supplied to device components when the components' minimum actuating voltage level has been attained at the capacitor. A deactuating voltage value of the threshold value circuit that is lower than the actuating voltage level prevents interruptions of operation similar to relaxation oscillation behavior due to temporarily increased actuating power requirements by causing deactivation of the components only if the capacitor voltage has dropped below a predetermined operational minimum. In this manner additional functions (such as radio watches with automatic hands setting devices or directional antennas, or ornamental pendulums or alarm or striking watches) which have components with higher acutating power requirements may be supplied without batteries by solar cells without having to overdimension the storage capacitor for the high startup load and thereby unnecessarily delay actuation of the device upon the exposure to radiation of the solar cells.

8 Claims, 1 Drawing Figure

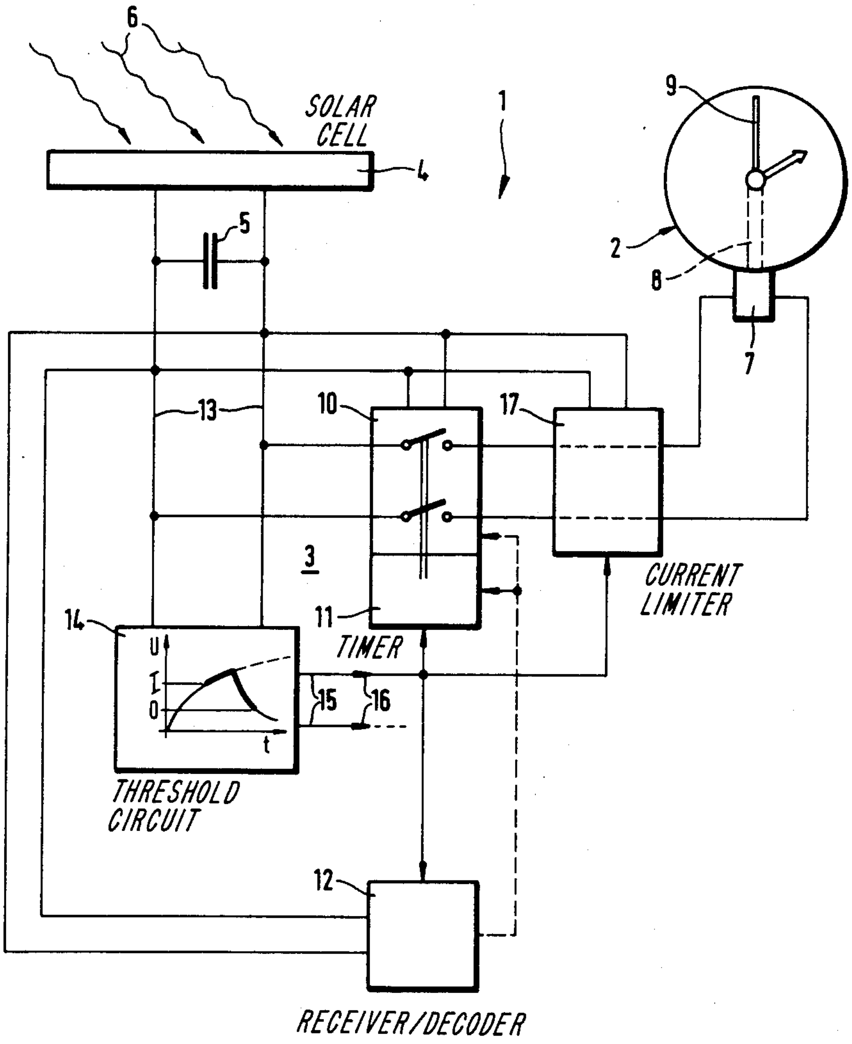
6
SOLAR CELL
1
4
9
5
2
8
7
13
10
17
3
CURRENT LIMITER
14
11
TIMER
U
I
0
t
15
16
THRESHOLD CIRCUIT
12
RECEIVER/DECODER

ELECTRONIC DEVICE POWERED BY SOLAR CELLS

BACKGROUND OF THE INVENTION

The present invention relates to solar-powered devices and in particular to timepieces of the type disclosed in Yamada, "'No Battery' Analog Quartz Watch," Proceedings No. 2 of the XI Internat Conf. for Chronometry, Paper #VA1, pp. 75–79 (Besancon, October 1984). In general, such a timepiece includes an array of solar cells to convert ambient illumination into electric current that drives a load consisting of the timepiece movement and whatever other function modules may be included. To provide continuous operation of the timepiece through periods of low-level light due to night or obscuration by clothing, an energy storage device such as a capacitor is charged by the solar cells when the light on the solar array is bright enough and discharged into the load when the light dims. The typical user certainly prefers the timepiece to function immediately after its initial exposure to light and to become fully charged as quickly as possible. Unfortunately, a quick-responding capacitor cannot store enough energy to drive the load for a usefully long time while a capacitor large enough to drive the load long enough cannot quickly reach an adequate supply voltage level.

As disclosed in FIG. 13 of the paper cited above, in addition to the charge and discharge circuits for a very high capacity capacitor serving as the operating storage, a small auxiliary capacitor is provided, the latter being connected in parallel directly to the watch circuit and through a return blocking diode to the solar cell. It is intended by this layout that in view of the small time constant of the lower value capacitor, the timepiece will start after only a brief illumination of the solar cell.

The disadvantage of this use of auxiliary starting means consists of the price and the space requirements of two capacitors and from the technical operating standpoint in particular the low capacity of the starting storage means. It results from this low capacity that while the watch is actuated even after only a brief exposure to light, the operation of the watch soon comes to a halt if the illumination was excessively brief. Thus, if a user ascertains, for example by actuating the illumination of a room, that the solar watch has started, he cannot be sure that it will run, for example through the night, if the room lights are turned off.

The use of rechargeable electrochemical charge storage means (batteries or secondary elements) is not feasible in the case of solar watches of this type, because the limited life of such elements, in spite of the buffering from the solar cell, requires the replacement of batteries from time to time by the user, which is exactly what the so-called battery-less solar watches of this type are intended to eliminate.

It has been found that to assure the continuous operation of a solar watch equipped with capacitive charge storage means the simple solution of significantly increasing the storage capacity is not applicable without further complications. Such an action would increase the charging time constant, whereby the rise of the voltage to the value required for the operation or in particular for the startup of the electric and electromechanical circuit components that consume the charge stored would be slowed to an unacceptable degree. The user cannot be expected to be willing to wait after the removal of the "no-battery" device from its packing for an extended period of time until the attainment of a regular function becomes recognizable.

Paradoxically, it is a fact that an increase in the capacity of the charge storage means may also entirely block the regular startup of a small device, for example, if the device contains circuit components characterized by high power requirements and/or clearly different minimum operating voltages. Due to the slow voltage rise forced by the high capacity, different parts of for example a watch circuit are actuated at very different points in time following the onset of the irradiation of the solar cell. The actuations of the parts may possibly again reduce the stored charge level in view of their high power requirements, so that the normal cooperation of the circuit components required for stable operation cannot be established. The device may even pass into a permanent relaxation oscillation state without ever attaining a stable operating condition.

Such unfavorable charging states immediately following the actuation of a device occur particularly when a radio watch is involved wherein at the onset of the operation more power is needed for operation of the radio receiver (and its decoding circuit for the time information received) and for the accelerated movement of the gears during the motion of the hands into their reference positions. Similarly unfavorable operating conditions, in particular immediately following the actuation of the device, are present if, in the course of activation certain decorative elements, such as ornamental pendulums, jerking figures or the like, must be set into motion. This is particularly the case when an electromechanical converter such as a stepper motor is provided, the high starting current of which is reduced to a stable operating level only after the onset of for example rotor movement by means of induction effects. In such cases, the high initial power needs may lead to a condition wherein the charging state of the capacitor cannot attain the voltage value required for the continuous normal operation of the entirety of the circuit components so that unrestricted actuation from an uncharged capacitor state is not assured.

OBJECT AND BRIEF SUMMARY OF THE INVENTION

In view of these conditions, it is the object of the present invention to provide a device of the aforementioned generic type of solar-powered timepiece wherein the safe actuation of the stable operating mode is assured even in the case of circuit components with different starting voltages and, in particular, high electrical loads especially at startup.

This object is attained, according to the present invention, by means of a threshold value circuit whereby the loading of the storage capacitor is temporarily blocked at the onset of charging, so that practically all of the electric charge supplied by the solar cell is available for the charging of the capacitor, with a consequent rapid rise of the voltage of the capacitor to above the minimum operating value required by the circuit components. Only then is the application of the loads of the circuit components on the capacitor permitted by the threshold value circuit; thus these circuit components enter their operational state simultaneously and independently of their different minimum operating voltages which are due to circuit layout requirements. In this manner the normal stable cooperation of all of the circuit components is assured even if higher loads temporarily occur at the onset of the operation, and if, because of the loads, the voltage of the capacitor temporarily ceases to rise or even decreases slightly.

Further, the present invention, the threshold value circuit does not disconnect if the capacitor voltage temporarily drops below its required value, as power needs are generally lower following the onset of the operation, as the result for example of the hand of a radio watch already having been moved into its correct position or of the kinetic energy of structural parts already in motion. A deactuating voltage value of the threshold value circuit may therefore be chosen significantly lower than the actuating voltage value, whereby interruptions of the operation by temporary capacitor voltage drops are practically prevented.

In another embodiment of the present invention, to avoid excessive voltage drops, the threshold value circuit is connected with the power consuming circuit components not directly but only functionally, i.e, it is laid out as a control stage issuing actuating or deactuating control signals to the essential circuit components. The loss of power which otherwise may occur in the case of large power consumers being supplied by means of auxiliary circuits, is thereby avoided. It is merely necessary then to insure that the control circuits for such consumers are initially in a blocking state at the onset of the operation and that the consumer is connected with the power source only if the threshold circuit has ascertained that the actuating voltage value has been exceeded.

High voltage limiting after the solar cell is avoided to the extent possible so that voltage peaks entering the power storage circuit in a square wave form may be utilized for charging the capacitor. Whenever this could result in a disadvantage in the operation of a power consumer such as a circuit component (for example in view of decreasing consumer efficiency at higher voltages), such disadvantages are readily eliminated by a current limiter connected in front of the consumer.

BRIEF DESCRIPTION OF THE DRAWING

The foregoing objects and advantages of the present invention will become apparent from the following detailed description read in conjunction with the drawing in which the single figure shows in the form of an abstract block circuit diagram an embodiment of the present invention.

DETAILED DESCRIPTION OF THE DRAWING

Referring to the figure, the solar timepiece 1 shown in the form of a small device comprises a watch movement 2, preferably of the electromechanical type, powered through an actuating circuit 3 by at least one solar cell 4. A charge storage capacitor 5 is connected in parallel with the solar cell 4 for the supply of electric power during time intervals when the excitation of the solar cell 4 by radiant energy 6 is interrupted by environmental effects for short or intermediate periods of time.

The watch movement 2 comprises an electromechanical converter, for example a stepper motor 7; connected by means of at least one operating clutch 8 with moving elements 9, such as hands, ornamental pendulums, figures, directional antennas, mechanical striking trains, or the like, which obtain their mechanical drive from the motor 7. The motor 7 derives its operating power through a control circuit 10 (for example a pole-reversing bridge circuit in the case of a single phase stepper motor) as directly as possible from the power source in the form of the solar cell 4 (or the auxiliary power source in the form of the capacitor 5) in order to prevent power losses in electric structural elements possibly connected into this power conduit.

The control circuit 10 is actuated in turn by a operating circuit 11, which in particular may consist of a quartz-stabilized, i.e. time-keeping, electronic watch circuit. Alternatively, actuation of the control circuit 10 may be effected by a supplementary circuit 12, as indicated in the drawing by broken lines, which may consist for example of a radio watch receiver and decoder, as described in detail in an earlier German application P No. 34 39 638.1 filed Oct. 30, 1984.

When the solar watch 1 is to be actuated initially, the capacitor 5 has not been charged. The electric charge generated in the solar cell 4 by the radiant energy 6 passes through the supply conductors 13. In view of the high capacity of the directly connected charge storage capacitor 5, the voltage U across the capacitor 5 rises exponentially over the time t, as schematically shown in the figure at the threshold value circuit 14 which is connected in parallel with the storage capacitor 5. As is well-known, the capacitor voltage U is thus a measure of the amount of charge stored in the capacitor. The minimum operating voltages of the various power consumers (electronic circuits and electromechanical structural elements) connected with the supply conductors 13 are relatively different, as are their power needs, with the consequence that at different points in time during the rise of the voltage U, different consumers are activated, thereby at least delaying the rise of the voltage U, possibly preventing it by the increase in demand due to their power requirements, or even reversing the rise of the voltage U. The result is that power consumers having relatively higher minimum operating voltages for their normal mode of operation, or relatively greater actuating power requirements, may not attain their normal operating states, and so a stable operating mode of the solar watch 1 may never be attained.

In order to overcome this startup problem, i.e. to be able to actuate the watch 1 independently of the highly different response and operating behavior of the individual electric components without a initial charging of the capacitor 5 directly by the irradiation of its solar cells 4, a threshold value circuit 14 is inserted after the charge storage capacitor 5. The threshold value circuit 14 is preferably connected in parallel with the capacitor 5 in view of the aforementioned problem of voltage drops in the power circuits. The threshold value circuit 14 permits the operation of the power consumers only if a voltage at least equal to an actuating voltage I is attained across the supply conductors 13, i.e. across the capacitor 5, so that a possible subsequent stagnation due to a power consumer's startup during the rise of the charging voltage U will not lead to the immediate deactivation of that operation. The threshold value circuit 14 is preferably further equipped with a shutdown hysteresis, i.e. with a deactuating voltage O which is lower than the actuating voltage I, whereby it is assured that even a predetermined drop in the supply voltage U will not result in the interruption of an operation just initiated. It may further be provided, as indicated in the drawing by a plurality of control lines 15, that different actuating/deactuating voltages I/O be queried respectively within the threshold value circuit 14 for power consumers or groups of consumers which are very different in terms of their electric operating behavior.

These consumers are released or blocked correspondingly by means of control or enable signals 16 that appear independently of one another but are functionally coordinated. The threshold circuit 14 is well-known in the art in itself and could comprise, for example, a number of coordinated Schmitt triggers or window comparators.

In any case, it is assured by the control signals 16 provided by the threshold value circuit 14 that the supply conductors 13 may be loaded, i.e. the power consuming circuits are actuated, only if the charge stored in the capacitor 5 as indicated by the voltage U is adequate for normal and sufficiently permanent operation, because the actuating voltage I has been exceeded and the deactuating voltage O not yet attained. In this way a relaxation oscillation mode of operation of the power consumers due to the higher startup power requirements, and thus the blocking of the normal operation of the device, is safely avoided. For example, the control circuit 10, which is inactive at the onset of operation, actuates the motor 7 only after the threshold value circuit 14 determines that the actuating voltage I has been attained.

As the operation of the threshold value circuit 14 does not require a voltage limiter between the solar cell 4 and the charge storage capacitor 5, it is of advantage that the voltage obtained from radiant energy 6 which is sufficiently constant is available directly for the operation of the power consumers such as circuits and other, for example electromechanical, structural elements. It is convenient, on the other hand to provide a current limiting circuit 17 in series with such consumers, the mode of operation of which depends strongly on the energy content of the actuating signals. For example, in the case of stepper motor 7, the step actuating torque is highly dependent on the supply voltage and declines strongly with a supply voltage either lower or higher than an optimum value. As the occurrence of an excessively small supply voltage is already avoided by the use of threshold value circuit 14 and the setting of deactuating voltage O, the circuit 17 for the optimization of the motor operation need not be designed to maintain constant power but can be designed for only current limitation in the actuation of the motor. This easier task may be accomplished by a structural element with a constant current characteristic (for example a transistor) at only a slight additional circuitry expense.

It will be appreciated by those of ordinary skill in the art that the present invention can be embodied in other specific forms without departing from the spirit or the essential characteristics thereof. The presently disclosed embodiments are therefore considered in all respects to be illustrative and not restrictive. The scope of the invention is illustrated by the appended claims rather than the foregoing description and all changes that come within the meaning and range of equivalents thereof are intended to be embraced therein.

What is claimed is:

1. An electrical apparatus for use in conjunction with means for converting radiant energy into electrical charge comprising:

a means for storing said charge, said means having a voltage corresponding to the amount of charge stored;

at least one means for consuming said charge stored by said storage means; and threshold means responsive to said voltage of the storage means for enabling the charge stored in said storage means to be applied to said consuming means when said voltage of the storage means exceeds a first predetermined value, the threshold means blocking the charge stored in said storage means from said consuming means when said voltage of the storage means is less than a second predetermined value that is less than said first predetermined value.

2. The apparatus of claim 1, wherein said threshold means includes means for generating a first control signal when said voltage of the storage means exceeds said first predetermined value, said threshold means being electrically connected in parallel with said storage means and said consuming means, and said consuming means consuming said charge in response to said first control signal.

3. The apparatus of claim 2, wherein said consuming means includes an electromechanical converter, a control circuit for controlling said electromechanical converter, and a current limiting circuit for limiting a rate of consumption of said charge by said converter, said control circuit being responsive to said first control signal.

4. The apparatus of claim 3, further comprising at least one accessory element for actuation by said converter, said accessory element consuming said charge, immediately upon actuation of said element, at a rate relatively higher than the rate of consumption during continuous operation of said element.

5. The apparatus of claim 2 further including a second consuming means and wherein said threshold means includes means for generating a second control signal when said voltage of the storage means exceeds a third predetermined value that is different from said first predetermined value to actuate said second consuming means.

6. The apparatus of claim 1 wherein said apparatus comprises a timepiece.

7. The apparatus of claim 1 wherein said charge storage means comprises a capacitor.

8. The apparatus of claim 6, further comprising at least one additional means for consuming charge stored by the storage means, the at least one additional consuming means having a high power requirement and being controlled by said at least one consuming means, wherein the threshold means delays onset of operation of the timepiece after an initial illumination of the radiant energy converting means.

* * * * *